US012271369B2

(12) United States Patent
Fenichel et al.

(10) Patent No.: US 12,271,369 B2
(45) Date of Patent: *Apr. 8, 2025

(54) SYSTEMS AND METHODS FOR ENHANCING TRANSACTION DATA

(71) Applicant: Capital One Services, LLC, McLean, VA (US)

(72) Inventors: Allison Fenichel, Brooklyn, NY (US); Amanda Sneider, New York, NY (US); Zenobia Zoila Liendo, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,458

(22) Filed: Dec. 12, 2023

(65) Prior Publication Data

US 2024/0111754 A1  Apr. 4, 2024

Related U.S. Application Data

(63) Continuation of application No. 17/518,606, filed on Nov. 4, 2021, now Pat. No. 11,886,417.

(51) Int. Cl.
*G06F 16/23* (2019.01)
*G06F 16/955* (2019.01)

(52) U.S. Cl.
CPC ...... *G06F 16/2365* (2019.01); *G06F 16/9566* (2019.01)

(58) Field of Classification Search
None
See application file for complete search history.

(56) References Cited

U.S. PATENT DOCUMENTS

| 8,538,827 B1 | 9/2013 | Dryer et al. |
| 2006/0129833 A1 | 6/2006 | Ellmore |
| 2008/0189192 A1* | 8/2008 | Ronen ............... G06Q 30/08 709/239 |

(Continued)

OTHER PUBLICATIONS

International Search Report and Written Opinion in related PCT Application No. PCT/US22/78971 mailed Mar. 10, 2023.

*Primary Examiner* — Irene Baker
(74) *Attorney, Agent, or Firm* — TROUTMAN PEPPER LOCKE LLP; Christopher J. Forstner; John A. Morrissett

(57) ABSTRACT

A system may receive, via a web browser plugin on a user device, a first timestamp associated with first click data at a website associated with a merchant, a referring uniform resource location (URL), a current URL, and first user identification data. The system may also receive transaction data including a second timestamp, second user identification data, and a first merchant name associated with a transaction with the merchant. The system may determine whether the first timestamp is within a predetermined period of the second timestamp and determine whether the first user identification data corresponds with the second user identification data. When the system determines that the first timestamp is within the predetermined period of the second timestamp and the first user identification data corresponds with the second user identification data, the system may store the referring URL and the current URL with the first merchant name in a database.

20 Claims, 6 Drawing Sheets

(56) References Cited

U.S. PATENT DOCUMENTS

| | | |
|---|---|---|
| 2010/0327054 A1 | 12/2010 | Hammad |
| 2011/0093327 A1 | 4/2011 | Fordyce, III et al. |
| 2011/0251952 A1 | 10/2011 | Kelly et al. |
| 2014/0019352 A1 | 1/2014 | Shrivastava |
| 2015/0088980 A1* | 3/2015 | Lakes ................... H04L 67/02 709/203 |
| 2015/0220951 A1 | 8/2015 | Kurapati et al. |
| 2016/0042388 A1 | 2/2016 | Chater et al. |
| 2016/0098790 A1 | 4/2016 | Herman et al. |
| 2019/0347686 A1 | 11/2019 | Hust |
| 2020/0242648 A1* | 7/2020 | Glazier ................ H04L 67/535 |
| 2020/0265379 A1 | 8/2020 | Walker et al. |
| 2021/0264429 A1 | 8/2021 | Kramme et al. |
| 2021/0342823 A1 | 11/2021 | Benkreira et al. |
| 2022/0078288 A1* | 3/2022 | Iorg ..................... G06F 16/972 |
| 2022/0172217 A1 | 6/2022 | Kang et al. |
| 2023/0036680 A1 | 2/2023 | Hayes et al. |

* cited by examiner

SYSTEMS AND METHODS FOR ENHANCING TRANSACTION DATA

CROSS-REFERENCE TO RELATED APPLICATIONS

This application is a continuation of, and claims priority under 35 U.S.C. § 120 to, U.S. patent application Ser. No. 17/518,606, filed Nov. 4, 2021, the entire contents of which are fully incorporated herein by reference.

FIELD

The disclosed technology relates to systems and methods for enhancing transaction data with click data. In particular, the disclosed technology relates to systems and methods for determining when to use click data to enhance transaction data via a dynamic graphical user interface or a dynamic account statement.

BACKGROUND

Transaction data (e.g., purchase price or transaction amount, transaction date, and a merchant identifier such as name and/or category) that is traditionally communicated when processing a transaction and included on an account statement contains limited data about the merchant involved in the transaction. The merchant's name and category details inputted by the merchant may be insufficiently descriptive, truncated, or abbreviated. Because of the limited amount of contextual information included in the transaction data, a customer or user may not recognize a particular transaction on their account statement, making it harder to correctly identify and counteract fraud and potentially bogging down customer call service support with questions about an unrecognized transaction. Online transactions and merchants often compound this challenge of identifying the merchant based on limited context in the transaction data because a customer is unable to identify a uniform resource location (URL) for a website where a transaction occurred (e.g., a third party checkout webpage), much less the URL for the merchant's website.

Accordingly, there is a need for enhancing transaction data with additional unique data sources such as click data or browsing data. Embodiments of the present disclosure are directed to this and other considerations.

SUMMARY

Disclosed embodiments may include a system for enhancing transaction data with click or browsing data. The system may include one or more processors, and memory in communication with the one or more processors and storing first instructions that are configured to cause the system to perform a method for enhancing merchant transaction data with merchant browsing data. For example, the system may receive a first timestamp associated with first click data at a website associated with a merchant, a referring uniform resource location (URL) (e.g., for a webpage that redirects the browser to the current or checkout URL), a current URL (e.g., for a checkout webpage associated with the merchant), and first user identification data (e.g., an account number associated with the user) via a web browser plugin on a user device. The system may also receive transaction data comprising a second timestamp, second user identification data, and a first merchant name associated with a transaction with the merchant. The system may determine whether the first timestamp is within a predetermined period of the second timestamp and determine whether the first user identification data corresponds with the second user identification data. When the system determines that the first timestamp is within the predetermined period of the second timestamp and the first user identification data corresponds with the second user identification data, the system may extract a second merchant name from the current URL and a third merchant name from the referring URL and determine whether the second merchant name at least partially matches the first merchant name. When the second merchant name at least partially matches the first merchant name, the system may transmit the referring URL and the second merchant name to the user device for display in a dynamic GUI on the user device. When the second merchant name fails to at least partially match the first merchant name, the system may determine whether the third merchant name at least partially matches the first merchant name. When the third merchant name at least partially matches the first merchant name, transmit the third merchant name to the user device for display in the dynamic GUI. When the third merchant name fails to at least partially match the first merchant name, the system may transmit the first merchant name to the user device for display in the dynamic GUI.

Disclosed embodiments may include a system for enhancing transaction data with click or browsing data. The system may include one or more processors, and memory in communication with the one or more processors and storing first instructions that are configured to cause the system to perform a method for enhancing merchant transaction data with merchant browsing data. For example, the system (e.g., merchant matching system 420) may receive, via a web browser plugin on a user device, a first timestamp associated with first click data at a website associated with a merchant, a referring uniform resource location (URL), a current URL, and first user identification data. The system may also receive transaction data comprising a second timestamp, second user identification data, and a first merchant name associated with a transaction with the merchant. Then, the system may determine whether the first timestamp occurs within a predetermined time threshold of the second timestamp and determine whether the first user identification data corresponds with the second user identification data. When the system determines that the first timestamp occurs within the predetermined time threshold of the second timestamp and the first user identification data corresponds with the second user identification data, the system may verify transaction data associated with the transaction.

Disclosed embodiments may include a system for enhancing transaction data with click or browsing data. The system may include one or more processors, and memory in communication with the one or more processors and storing first instructions that are configured to cause the system to perform a method for enhancing merchant transaction data with merchant browsing data. For example, the system (e.g., merchant matching system 420) may receive, via a web browser plugin on a user device, a first timestamp associated with first click data at a website associated with a merchant, a referring uniform resource location (URL), a current URL, and first user identification data. The system may also receive transaction data comprising a second timestamp, second user identification data, and a first merchant name associated with a transaction with the merchant. The system may determine whether the first timestamp is within a predetermined period of the second timestamp and determine whether the first user identification data corresponds with the second user identification data. When the system determines that the first timestamp is within the predetermined period of the second timestamp and the first user identification data corresponds with the second user identification data, the system may store the referring URL and the current URL with the first merchant name in a database.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for enhancing transaction data with click data. In particular, the disclosed technology relates to systems and methods for determining when to use click data to enhance transaction data via a dynamic graphical user interface or a dynamic account statement. The systems and methods described herein are necessarily rooted in computer technology as they relate to automatically matching click data from a web browser extension with transaction data to enhance/supplement an account statement listing transaction. Importantly, examples of the present disclosure provide the capability for providing enhance account statement or dynamic graphical user interfaces. Additionally, improve the speed with which computers can determine the correct merchant associated with a transaction.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1A:
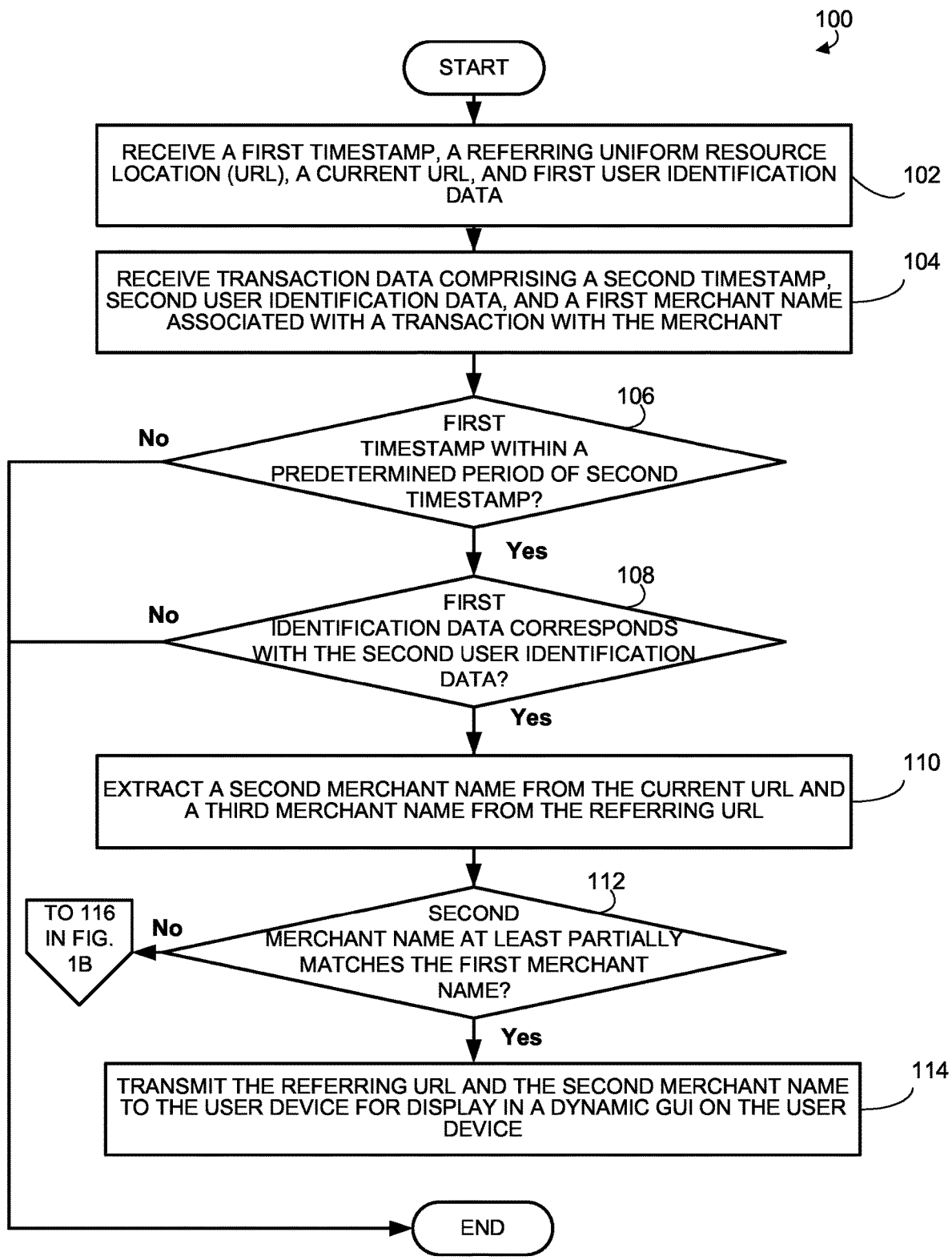
FIGS. 1A and 1B are flow diagrams illustrating an exemplary method for enhancing transaction data with click data, in accordance with certain embodiments of the disclosed technology.
Figure 1B:
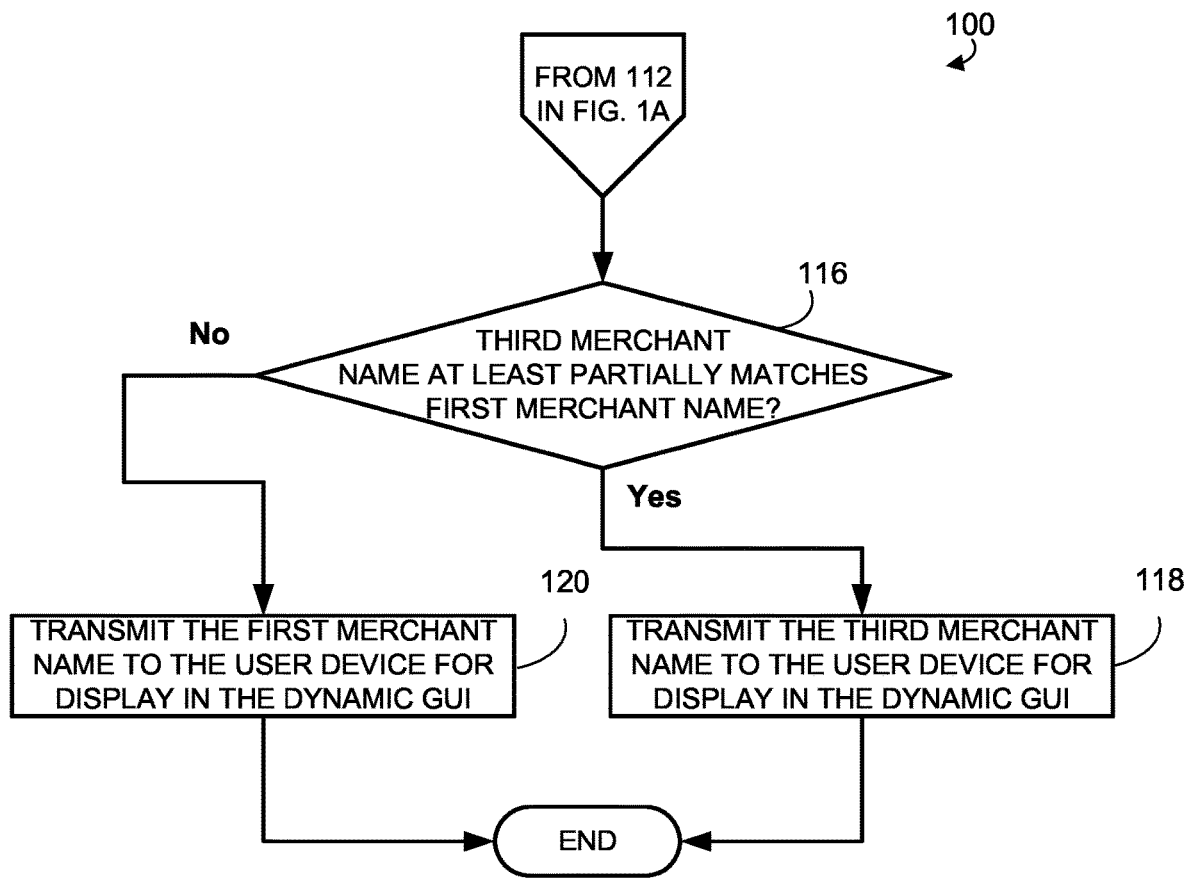

FIGS. 1A and 1B are flow diagrams illustrating an exemplary method 100 for enhancing transaction data with click data, in accordance with certain embodiments of the disclosed technology. The steps of method 100 may be performed by one or more components of the system 500 (e.g., merchant matching system 420 or web server 510 of data augmenting system 508 or user device 502), as described in more detail with respect to FIGS. 4 and 5. Although method 100 is described as being performed by the merchant matching system 420, the user device 502 or the web server 510 may perform some similar steps described below in place of or with merchant matching system 420.

In block 102, the merchant matching system 420 may receive, via a web browser plugin on a user device 502, a first timestamp associated with first click data or page view data at a website associated with a merchant, a referring uniform resource location (URL), a current URL, and first user identification data. For example, a user device 502 may navigate to a current URL (e.g., a checkout URL) from a referring URL. In some cases, the referring URL and the current URL may be correspond to the same entity or merchant (e.g., Apple®). Other times, the referring URL may correspond to a merchant (e.g., a small business or a grocery store) and the current or checkout URL may correspond to a payment processor (e.g., Shopify) that facilitates the processing of shipping and payment information to the merchant. The first timestamp may correspond with the user accessing the current or checkout URL with the user device 502, which may be detected by the web browser plugin residing on the user device and at least partially controlled by the merchant matching system 420. The first click data does not necessarily have to involve clicking anything on the webpage associated with the current/checkout URL.

In block 104, the merchant matching system 420 may receive transaction data comprising a second timestamp, second user identification data, and a first merchant name associated with a transaction with the merchant. For example, the transaction data may be associated with an attempted or completed transaction. Example transaction data is as follows:
merchantCity: NOVI
merchantCountryCode: 440
merchantId: 000005061284711
merchantName: OLD NAVY ON-LINE
merchantState: 42
merchantZip: 48374

In block 106, the merchant matching system 420 may determine whether the first timestamp is within a predetermined period of the second timestamp. For example, the first timestamp may be Jun. 11, 2021 at 11:01 am EST, the second timestamp may be Jun. 11, 2021 at 11:20 am EST, and the predetermined period may be 3 minutes. Thus, the merchant matching system 420 may determine that the first timestamp is within the predetermined period of the second time stamp.

When the merchant matching system 420 determines that the first timestamp is within the predetermined period of the second timestamp, the merchant matching system 420 may proceed to block 108. When the merchant matching system 420 determines that the first timestamp is not within the predetermined period of the second timestamp, the merchant matching system 420 may end the processing.

In block 108, the merchant matching system 420 may determine whether the first user identification data corresponds with the second user identification data. For example, the first user identification may be an account number associated with the user and the second user identification data may also be the same account number associated with the user. In other examples, the first user identification data and/or the second user identification data may include a user's name, one or more phone numbers, one or more account numbers, one or more addresses, one or more email addresses, a birth date, a user name and password work linked to the one or more account numbers.

Moreover, the first user identification data may correspond with the second user identification data when they match beyond a predetermined matching threshold. For example, the first user identification data may include single sign on identification (SSOID) which is linked to one or more account numbers. The second user identification data may simply be a single account number that matches the one or more account numbers linked to the SSOID of the user. Thus, while the SSOID does not directly match the single account number, the SSOID shares associated identification data that does match. Therefore, the merchant matching system 420 may determine that the first user identification data and the second user identification data corresponds.

When the merchant matching system 420 determines that the first user identification data and the second user identification data corresponds, the merchant matching system 420 may proceed to block 110. When the merchant matching system 420 determines that the first user identification data and the second user identification data do not correspond corresponds (e.g., they do not include or are not related to the same account number), the merchant matching system 420 may end processing.

In block 110, the merchant matching system 420 may extract a second merchant name from the current URL and a third merchant name from the referring URL. For example, the merchant matching system 420 may parse the current URL and the referring URL to extract the domain names as the second and third merchant names.

In block 112, the merchant matching system 420 may determine whether the second merchant name at least partially matches or fuzzy matches the first merchant name. For example, the second merchant name (corresponding to the current URL) may be Nike and the first merchant name may be Nike Factory Store. In this case, the second merchant name at least partially matches the first merchant name because they both include "Nike." In some embodiments, the merchant matching system 420 may determine whether the second merchant name at least partially matches the first merchant name beyond a second predetermined matching threshold (e.g., at least so many characters match or Levenshtein distance, etc.). In some instances, there may be abbreviations, acronyms or other versions of names for the business that might not be a direct substring of one another. Thus, some embodiments use other string comparison methods like Jaro-Winkler or Jaccard similarity that can measure string similarity beyond just one string having a partial match of the other.

In some embodiments, the URL data and the transaction data may be provided to a model (e.g., a trained machine learning model) to determine a probabilistic score of how similar the URL and transaction data is. The system may compare the probabilistic score to a threshold to determine whether to associate the data.

When the merchant matching system 420 determines the second merchant name at least partially matches the first merchant name (beyond a second predetermined matching threshold), the merchant matching system 420 may proceed to block 114. When the merchant matching system 420 determines the second merchant name does not at least partially matches the first merchant name (beyond the second predetermined matching threshold), the merchant matching system 420 may proceed to block 116.

In block 114, the merchant matching system 420 may transmit the second merchant name to the user device 502 for display in a dynamic GUI on the user device 502. For example, the merchant matching system 420 may generate graphical user interface objects for the dynamic GUI indicating that the merchant associated with the transaction is also associated with the second merchant name.

In block 116, the merchant matching system 420 may determine whether the third merchant name at least partially matches the first merchant name. When the merchant matching system 420 determines the third merchant name at least partially matches the first merchant name (beyond a second predetermined matching threshold), the merchant matching system 420 may proceed to block 118. When the merchant matching system 420 determines the second merchant name does not at least partially matches the first merchant name (beyond the second predetermined matching threshold), the merchant matching system 420 may proceed to block 120.

In block 118, the merchant matching system 420 may transmit the third merchant name to the user device 502 for display in the dynamic GUI. For example, the merchant matching system 420 may generate one or more graphical user interface objects for the dynamic GUI indicating that the merchant associated with the transaction is also associated with the third merchant name In some embodiments, the merchant matching system may also generate one or more graphical user interface objects for the dynamic GUI indicating that the referring URL is associated with the transaction and the merchant.

In block 120, the merchant matching system 420 may transmit the first merchant name to the user device 502 for display in the dynamic GUI. For example, the merchant matching system 420 may generate one or more GUI objects for the dynamic GUI indicating that the merchant associated with the transaction is also associated with the first merchant name.

Figure 2:
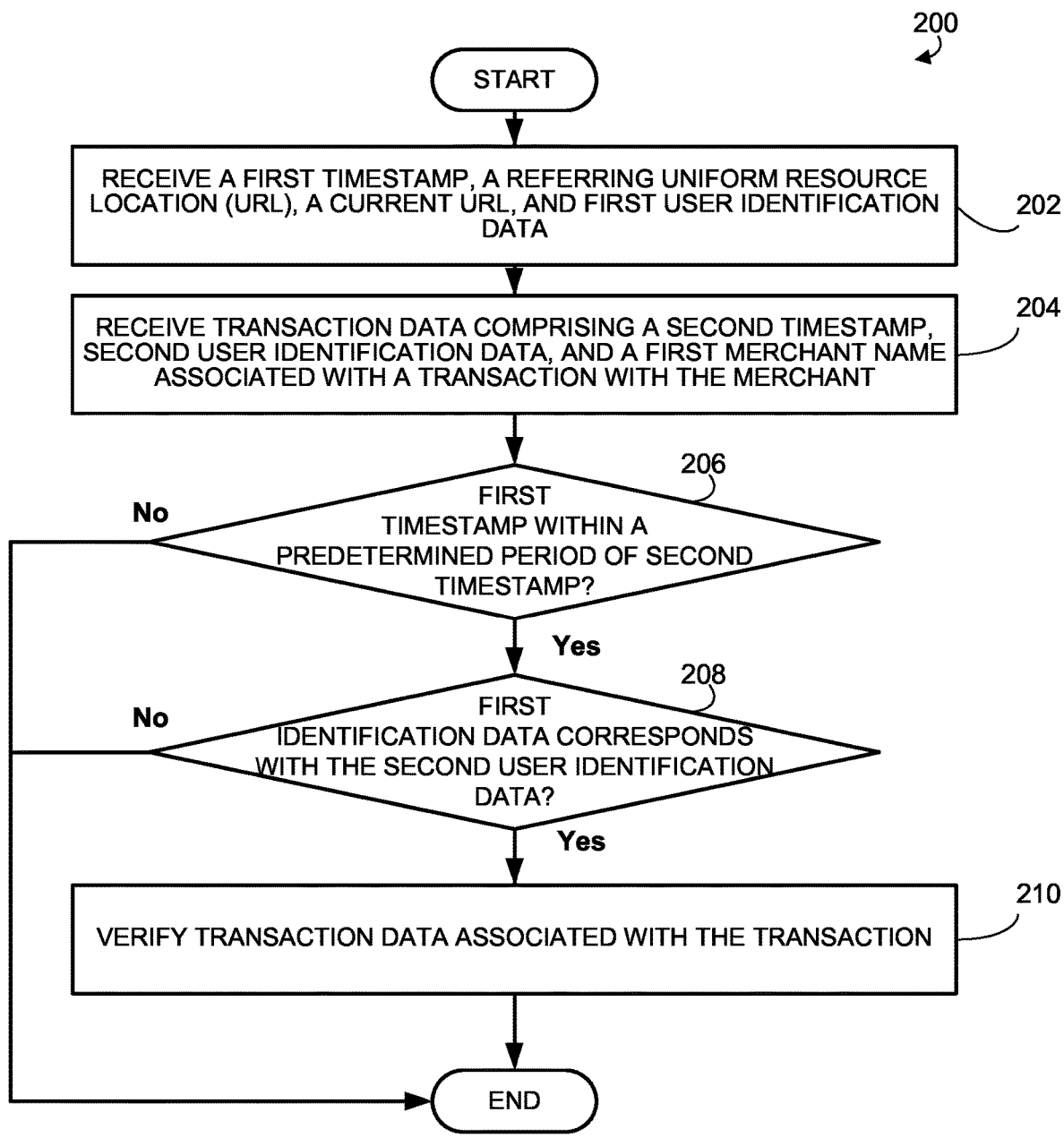
FIG. 2 is a flow diagram illustrating an exemplary method for enhancing transaction data with click data, in accordance with certain embodiments of the disclosed technology.

FIG. 2 is a flow diagram illustrating an exemplary method 200 for enhancing transaction data with click data, in accordance with certain embodiments of the disclosed technology. The steps of method 200 may be performed by one or more components of the system 500 (e.g., merchant matching system 420 or web server 510 of data augmenting system 508 or user device 502), as described in more detail with respect to FIGS. 4 and 5.

Method 200 of FIG. 2 is similar to method 100 of FIGS. 1A and 1B, except that method 200 may not include blocks 112, 114, 116, 118, 120 of method 100. The descriptions of blocks 202, 204, 206, and 208 in method 200 are similar to the respective descriptions of blocks 102, 104, 106, and 108 in method 100 and are not repeated herein for brevity. However, block 210 is different from block 110 in method 100 and is described below.

In block 210, the merchant matching system 420 may verify transaction data associated with the transaction. For example, verifying the transaction data may include, as described above, extracting a second merchant name from the current URL and a third merchant name from the referring URL, determining whether the second merchant name matches the first merchant name beyond a predetermined matching threshold, based on the second merchant name matching the first merchant name beyond the predetermined matching threshold, transmitting the second merchant name to the user device for display in a dynamic GUI, based on the second merchant name failing to match the first merchant name beyond the predetermined matching threshold: determining whether the third merchant name matches the first merchant name beyond the predetermined matching threshold, based on the third merchant name matching the first merchant name beyond the predetermined matching threshold, transmitting the third merchant name to the user device for display in the dynamic GUI, and based on the third merchant name failing to match the first merchant name beyond the predetermined matching threshold, transmitting the first merchant name to the user device for display in the dynamic GUI.

Figure 3:
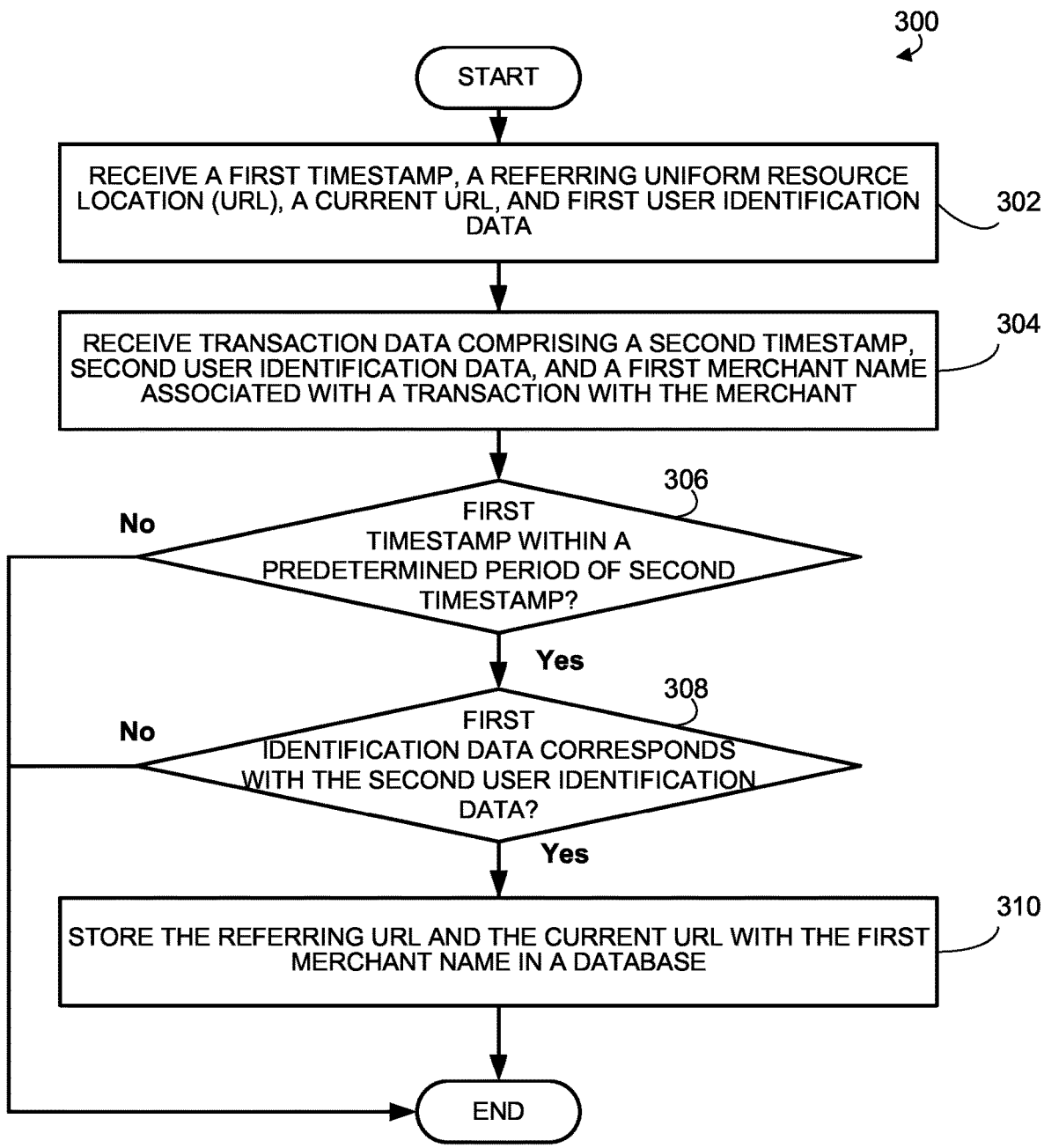
FIG. 3 is a flow diagram illustrating an exemplary method for enhancing transaction data with click data, in accordance with certain embodiments of the disclosed technology.

FIG. 3 is a flow diagram illustrating an exemplary method 300 for enhancing transaction data with click data, in accordance with certain embodiments of the disclosed technology. The steps of method 300 may be performed by one or more components of the system 500 (e.g., merchant matching system 420 or web server 510 of data augmenting system 508 or user device 502), as described in more detail with respect to FIGS. 4 and 5.

Method 300 of FIG. 3 is similar to method 200 of FIG. 2, except that method 300 may not include a block similar to block 210. The descriptions of blocks 302, 304, 306, and 308 in method 300 are similar to the respective descriptions of blocks 202, 204, 206, and 208 of method 200 and are not repeated herein for brevity. However, block 310 is different from block 210 and is described below.

In block 310, the merchant matching system 420 may store the referring URL and the current URL with the first merchant name in a database. In other embodiments, the referring URL and the current URL may be linked with one another. Thus, when the current URL is accessed, the associated merchant data takes into account the referring URL.

Figure 4:
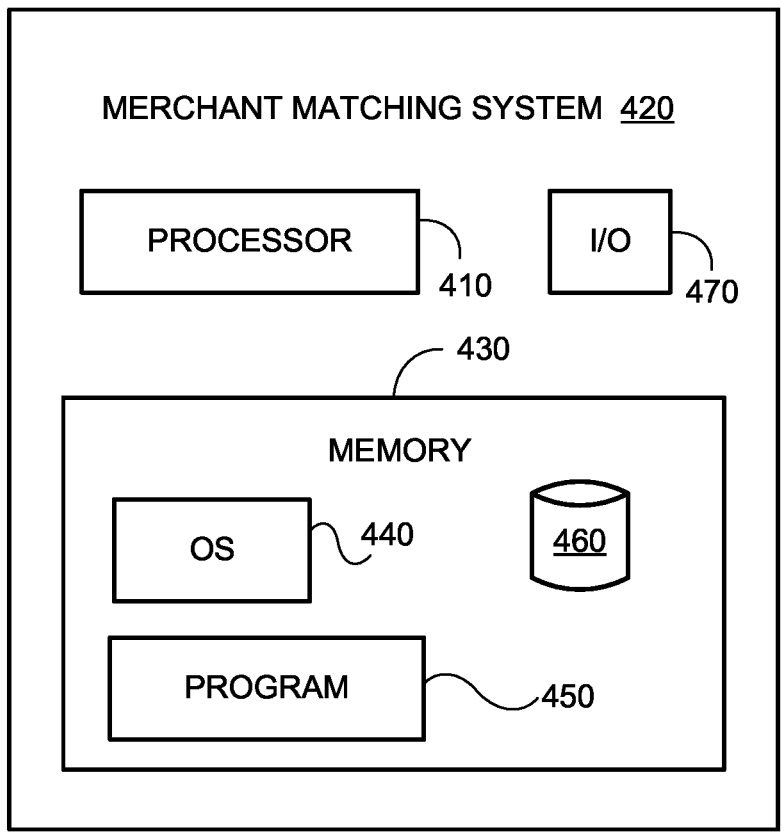
FIG. 4 is a block diagram of an example merchant matching system used to match click data with transaction data, according to an example implementation of the disclosed technology.
Figure 5:
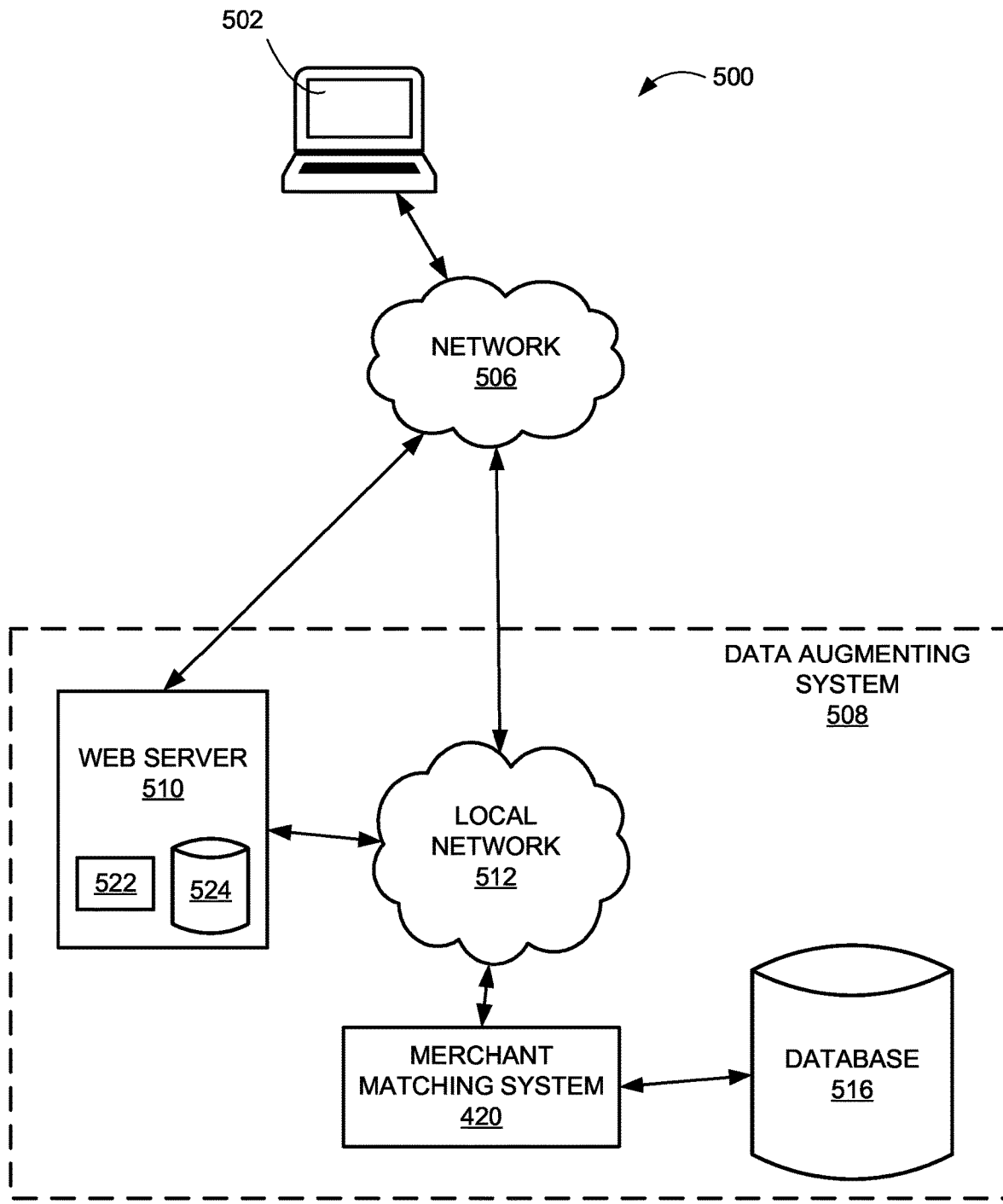
FIG. 5 is a block diagram of an example system that may be used to match click data with transaction data, according to an example implementation of the disclosed technology.

FIG. 4 is a block diagram of an example merchant matching system 420 used to match click data with transaction data, according to an example implementation of the disclosed technology. According to some embodiments, the user device 502 and web server 510, as depicted in FIG. 5 and described below, may have a similar structure and components that are similar to those described with respect to merchant matching system 420 shown in FIG. 4. As shown, the merchant matching system 420 may include a processor 410, an input/output ("I/O") device 470, a memory 430 containing an operating system ("OS") 440 and a program 450. In certain example implementations, the merchant matching system 420 may be a single server or may be configured as a distributed computer system including multiple servers or computers that interoperate to perform one or more of the processes and functionalities associated with the disclosed embodiments. In some embodiments, merchant matching system 420 may be one or more servers from a serverless or scaling server system. In some embodiments, the merchant matching system 420 may further include a peripheral interface, a transceiver, a mobile network interface in communication with the processor 410, a bus configured to facilitate communication between the various components of the merchant matching system 420, and a power source configured to power one or more components of the merchant matching system 420.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 410 may be a single core processor that is configured with virtual processing technologies. In certain embodiments, the processor 410 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the merchant matching system 420 may include one or more storage devices configured to store information used by the processor 410 (or other components) to perform certain functions related to the disclosed embodiments. In one example, the merchant matching system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the merchant matching system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the merchant matching system 420 may include the memory 430 that may include one or more programs 450 to perform one or more functions of the disclosed embodiments.

The processor 410 may execute one or more programs located remotely from the merchant matching system 420. For example, the merchant matching system 420 may access one or more remote programs that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a merchant matching database 460 for storing related data to enable the merchant matching system 420 to perform one or more of the processes and functionalities associated with the disclosed embodiments.

The merchant matching database 460 may include stored data relating to one or more issues, users, and mapping data of the one or more issues to one or more troubleshooting steps (e.g., list or spreadsheets linking or mapping one or more issues to one or more trouble shooting steps). According to some embodiments, the functions provided by the merchant matching database 460 may also be provided by a database that is external to the merchant matching system 420, such as the database 516 as shown in FIG. 5.

The merchant matching system 420 may also be communicatively connected to one or more memory devices (e.g., databases) locally or through a network. The remote memory devices may be configured to store information and may be accessed and/or managed by the merchant matching system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The merchant matching system 420 may also include one or more I/O devices 470 that may comprise one or more interfaces for receiving signals or input from devices and providing signals or output to one or more devices that allow data to be received and/or transmitted by the merchant matching system 420. For example, the merchant matching system 420 may include interface components, which may provide interfaces to one or more input devices, such as one or more keyboards, mouse devices, touch screens, track pads, trackballs, scroll wheels, digital cameras, microphones, sensors, and the like, that enable the merchant matching system 420 to receive data from a user (such as, for example, via the user device 502).

In example embodiments of the disclosed technology, the merchant matching system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the merchant matching system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the merchant matching system 420 may include a greater or lesser number of components than those illustrated.

FIG. 5 is a block diagram of an example system that may be used to match click data with transaction data, according to an example implementation of the disclosed technology. The components and arrangements shown in FIG. 5 are not intended to limit the disclosed embodiments as the components used to implement the disclosed processes and features may vary. As shown, data augmenting system 508 may interact with a user device 502 via a network 506. In certain example implementations, the data augmenting system 508 may include a local network 512, a merchant matching system 420, a web server 510, and a database 516.

In some embodiments, a user may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 5506 and ultimately communicating with one or more components of the data augmenting system 508. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data augmenting system 508. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

The data augmenting system 508 may be associated with and optionally controlled by one or more entities such as a business, corporation, individual, partnership, or any other entity that provides one or more of goods, services, and consultations to individuals such as customers. In some embodiments, the data augmenting system 508 may be controlled by a third party on behalf of another business, corporation, individual, partnership. The data augmenting system 508 may include one or more servers and computer systems for performing one or more functions associated with products and/or services that the organization provides.

Web server 510 may include a computer system configured to generate and provide one or more websites accessible to customers, as well as any other individuals involved in data augmenting system's 508 normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., merchant matching system 420) of system 500. In some embodiments, web server 510 may host websites or applications that may be accessed by the user device 502. For example, web server 510 may host a financial service provider website that a user device may access by providing an attempted login that are authenticated by the merchant matching system 420. According to some embodiments, web server 510 may include software tools, similar to those described with respect to user device 502 above, that may allow web server 510 to obtain network identification data from user device 502.

The local network 512 may include any type of computer networking arrangement used to exchange data in a localized area, such as WiFi, Bluetooth™ Ethernet, and other suitable network connections that enable components of the data augmenting system 508 to interact with one another and to connect to the network 506 for interacting with components in the system 500 environment. In some embodiments, the local network 412 may include an interface for communicating with or linking to the network 506. In other embodiments, certain components of the data augmenting system 508 may communicate via the network 506, without a separate local network 506.

In accordance with certain example implementations of the disclosed technology, the data augmenting system 508 may include one or more computer systems configured to compile data from a plurality of sources the merchant matching system 420, web server 510, and/or the database 516. The merchant matching system 420 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, ATM, and business operations. The database 516 may also serve as a back-up storage device and may contain data and information that is also stored on, for example, database 460, as discussed with reference to FIG. 4.

Although the preceding description describes various functions of a web server 510, a merchant matching system 420, and a database 516, in some embodiments, some or all of these functions may be carried out by a single computing device or a plurality of computing devices in a (cloud) serverless system.

Exemplary Use Case

A user navigates his user device's 502 web browser using a browser plug in to nike.com and finds a pair of shoes to purchase. The user selected the pair of shoes and clicks the checkout button, which directs the web browser to checkout page on the Nike website (e.g., nike.com/checkout). On the checkout page, the user enters his credit card information and submits the purchase. The bank associated with the user's credit card employs a merchant matching system 420 to enhance transaction details for its customers that use its browser plug in. The merchant matching system 420 receives, via the web browser plugin on a user device, a first timestamp (e.g., 12:01 pm EST on 09-12-2021) associated with first click data (browsing data) at nike.com, a referring uniform resource location (URL) (e.g., nike.com), a current URL (e.g., nike.com/checkout), and first user identification data (e.g., credit card number or user name). The merchant matching system 420 receives transaction data including a second timestamp (e.g., 12:01 pm EST on 09-12-2021), second user identification data (e.g., credit card number), and a first merchant name (e.g., Nike) associated with the transaction. The merchant matching system 420 determines whether the first timestamp is within a predetermined period (e.g., 20 minutes) of the second timestamp and determine whether the first user identification data corresponds (e.g., matches, partially matches, or has partially matching linked data) with the second user identification data. The merchant matching system 420 determines that the first timestamp is within the predetermined period of the second timestamp and the first user identification data corresponds with the second user identification data: The merchant matching system 420 extracts a second merchant name (e.g., Nike) from the current URL (e.g., nike.com/checkout) and a third merchant name (e.g., Nike) from the referring URL (e.g., nike.com) and determines whether the second merchant name at least partially matches the first merchant name.

When the second merchant name (e.g., Nike) at least partially matches the first merchant name, the merchant matching system 420 transmits the referring URL and the second merchant name to the user device for display in a dynamic GUI on the user device. When the second merchant name fails to at least partially match the first merchant name, the merchant matching system 420 determines whether the third merchant name at least partially matches the first merchant name. When the third merchant name at least partially matches the first merchant name, the merchant matching system 420 transmits the third merchant name to the user device for display in the dynamic GUI. When the third merchant name fails to at least partially match the first merchant name, the merchant matching system 420 transmits the first merchant name to the user device for display in the dynamic GUI.

The dynamic GUI may be a list of transactions with associated with the credit card showing not only the transaction data but the optimized merchant name as determined by the merchant matching system 420 as well as the referring URL and/or the current URL. The user using user device 502 may access this dynamic GUI via a personalized website created by merchant matching system 420 and/or webserver 510.

In some examples, disclosed systems or methods may involve one or more of the following clauses:

Clause 1: A system comprising: one or more processors; and memory in communication with the one or more processors and storing instructions that, when executed by the one or more processors, are configured to cause the system to: receive, via a web browser plugin on a user device, a first timestamp associated with first click data at a website associated with a merchant, a referring uniform resource location (URL), a current URL, and first user identification data; receive transaction data comprising a second timestamp, second user identification data, and a first merchant name associated with a transaction with the merchant; determine whether the first timestamp is within a predetermined period of the second timestamp; determine whether the first user identification data corresponds with the second user identification data; and responsive to determining that the first timestamp is within the predetermined period of the second timestamp and the first user identification data corresponds with the second user identification data: extract a second merchant name from the current URL and a third merchant name from the referring URL; determine whether the second merchant name at least partially matches the first merchant name; when the second merchant name at least partially matches the first merchant name, transmit the referring URL and the second merchant name to the user device for display in a dynamic GUI on the user device; when the second merchant name fails to at least partially match the first merchant name: determine whether the third merchant name at least partially matches the first merchant name; when the third merchant name at least partially matches the first merchant name, transmit the third merchant name to the user device for display in the dynamic GUI; and when the third merchant name fails to at least partially match the first merchant name, transmit the first merchant name to the user device for display in the dynamic GUI.

Clause 2: The system of clause 1, wherein the instructions are further configured to cause the system to: responsive to determining that (i) the first timestamp is not within the predetermined period of the second timestamp or (ii) the first user identification data does not correspond with the second user identification data, classify the transaction as a card-on-file transaction and update the dynamic GUI to include a card-on-file indication.

Clause 3: The system of clause 1, wherein the instructions are further configured to cause the system to: generate or update a dynamic account statement with the transaction, referring URL, the current URL, and the third merchant name in response to determining that the first timestamp is within the predetermined period of the second timestamp, the first user identification data corresponds with the second user identification data, and the third merchant name at least partially matches the first merchant name.

Clause 4: The system of clause 1, wherein receiving the first timestamp associated with first click data at the website associated with the merchant, the referring URL, the current URL, and the first user identification data occurs when the web browser plugin on the user device identifies one or more fields on a web page associated with the current URL.

Clause 5: The system of clause 1, wherein the first user identification data comprises single sign on identification data (SSOID) and wherein the second user identification data comprises account number, name, and/or address associated with a first user and the transaction.

Clause 6: The system of clause 1, wherein the instructions are further configured to cause the system to: generate or update a dynamic account statement with the transaction, referring URL, the current URL, and the first merchant name in response to determining that the first timestamp is within the predetermined period of the second timestamp, the first user identification data corresponds with the second user identification data, and the third merchant name failing to at least partially match the first merchant name.

Clause 7: The system of clause 1, wherein the instructions are further configured to cause the system to: store the referring URL and the current URL with the third merchant name in a database responsive to determining that the first timestamp is within the predetermined period of the second timestamp, the first user identification data corresponds with the second user identification data, and the third merchant name at least partially matches the first merchant name.

Clause 8: A system comprising: one or more processors; and memory in communication with the one or more processors and storing instructions that, when executed by the one or more processors, are configured to cause the system to: receive, via a web browser plugin on a user device, a first timestamp associated with first click data at a website associated with a merchant, a referring uniform resource location (URL), a current URL, and first user identification data; receive transaction data comprising a second timestamp, second user identification data, and a first merchant name associated with a transaction with the merchant; determine whether the first timestamp occurs within a predetermined time threshold of the second timestamp; determine whether the first user identification data corresponds with the second user identification data; and responsive to determining that the first timestamp occurs within the predetermined time threshold of the second timestamp and the first user identification data corresponds with the second user identification data, verify transaction data associated with the transaction.

Clause 9: The system of clause 8, wherein the instructions are further configured to cause the system to: responsive to determining that (i) the first timestamp does not occur within the predetermined time threshold of the second timestamp or (ii) the first user identification data does not correspond with the second user identification data, identify the transaction as a card-on-file transaction and update a dynamic GUI to display an indicator representative of a card-on-file transaction.

Clause 10: The system of clause 8, wherein the instructions are further configured to cause the system to: generate or update a dynamic account statement with the transaction, referring URL, the current URL, and the first merchant name in response to determining that the first timestamp occurs within the predetermined time threshold of the second timestamp and the first user identification data corresponds with the second user identification data.

Clause 11: The system of clause 8, wherein receiving the first timestamp associated with first click data at the website associated with the merchant, the referring URL, the current URL, and the first user identification data occurs responsive to the web browser plugin on the user device identifying one or more fields on a web page associated with the current URL.

Clause 12: The system of clause 8, wherein the first user identification data comprises single sign on identification data (SSOID).

Clause 13: The system of clause 12, wherein the second user identification data comprises account number, name, and/or address associated with a first user and the transaction.

Clause 14: The system of clause 8, wherein the instructions are further configured to cause the system to: store the referring URL and the current URL with the first merchant name in a database responsive to determining that the first timestamp occurs within the predetermined time threshold of the second timestamp and the first user identification data corresponds with the second user identification data.

Clause 15: The system of clause 8, wherein verifying the transaction data comprises: extracting a second merchant name from the current URL and a third merchant name from the referring URL; determining whether the second merchant name matches the first merchant name beyond a predetermined matching threshold; based on the second merchant name matching the first merchant name beyond the predetermined matching threshold, transmitting the second merchant name to the user device for display in a dynamic GUI; based on the second merchant name failing to match the first merchant name beyond the predetermined matching threshold: determining whether the third merchant name matches the first merchant name beyond the predetermined matching threshold; based on the third merchant name matching the first merchant name beyond the predetermined matching threshold, transmitting the third merchant name to the user device for display in the dynamic GUI; and based on the third merchant name failing to match the first merchant name beyond the predetermined matching threshold, transmitting the first merchant name to the user device for display in the dynamic GUI.

Clause 16: A system comprising: one or more processors; and memory in communication with the one or more processors and storing instructions that, when executed by the one or more processors, are configured to cause the system to: receive, via a web browser plugin on a user device, a first timestamp associated with first click data at a website associated with a merchant, a referring uniform resource location (URL), a current URL, and first user identification data; receive transaction data comprising a second timestamp, second user identification data, and a first merchant name associated with a transaction with the merchant; determine whether the first timestamp is within a predetermined period of the second timestamp; determine whether the first user identification data corresponds with the second user identification data; and responsive to determining that the first timestamp is within the predetermined period of the second timestamp and the first user identification data corresponds with the second user identification data, store the referring URL and the current URL with the first merchant name in a database.

Clause 17: The system of clause 16, wherein the instructions are further configured to cause the system to: responsive to determining that the first timestamp is not within the predetermined period of the second timestamp or the first user identification data does not correspond with the second user identification data, associate the transaction as a card-on-file transaction and update a dynamic GUI to display a card-on-file indication.

Clause 18: The system of clause 16, wherein the instructions are further configured to cause the system to: generate or update a dynamic account statement with the transaction, referring URL, the current URL, and the first merchant name in response to determining that the first timestamp is within the predetermined period of the second timestamp and the first user identification data corresponds with the second user identification data.

Clause 19: The system of clause 16, wherein receiving the first timestamp associated with first click data at the website associated with the merchant, the referring URL, the current URL, and the first user identification data occurs when the web browser plugin on the user device identifies one or more fields on a web page associated with the current URL.

Clause 20: The system of clause 16, wherein: the first user identification data comprises single sign on identification data (SSOID); and the second user identification data comprises account number, name, and/or address associated with a first user and the transaction.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   memory in communication with the one or more processors and storing instructions that, when executed by the one or more processors, are configured to cause the system to:
   receive a first timestamp associated with first click data at a website associated with a merchant, a referring link, a current link, and first user identification data;
   receive transaction data comprising a second timestamp, second user identification data, and a first name associated with a transaction with the merchant;
   determine whether the first timestamp is within a predetermined period of the second timestamp;
   determine whether the first user identification data corresponds with the second user identification data; and
   responsive to determining that the first timestamp is within the predetermined period of the second timestamp and the first user identification data corresponds with the second user identification data:
   extract a second name from the current link and a third name from the referring link;
   determine whether the second name at least partially matches the first name; and
   when the second name at least partially matches the first name, transmit the referring link and the second name to a user device for display in a graphical user interface (GUI) on the user device.

2. The system of claim 1, wherein the instructions are further configured to cause the system to:
   when the second name fails to at least partially match the first name:
   determine whether the third name at least partially matches the first name;
   when the third name at least partially matches the first name, transmit the third name to the user device for display in the GUI; and
   when the third name fails to at least partially match the first name, transmit the first name to the user device for display in the GUI.

3. The system of claim 1, wherein the instructions are further configured to cause the system to:
   responsive to determining that (i) the first timestamp is not within the predetermined period of the second timestamp or (ii) the first user identification data does not correspond with the second user identification data, classify the transaction as a card-on-file transaction and update the GUI to include a card-on-file indication; and
   generate or update an account statement with the transaction, referring link, the current link, and the third name in response to determining that the first timestamp is within the predetermined period of the second timestamp, the first user identification data corresponds with the second user identification data, and the third name at least partially matches the first name.

4. The system of claim 1, wherein receiving the first timestamp associated with first click data at the website associated with the merchant, the referring link, the current link, and the first user identification data occurs when user device accesses the current link.

5. The system of claim 1, wherein the first user identification data comprises single sign on identification data (SSOID) and wherein the second user identification data comprises account number, name, address associated with a first user and the transaction, or combinations thereof.

6. The system of claim 1, wherein the instructions are further configured to cause the system to: generate or update an account statement with the transaction, referring link, the current link, and the first name in response to determining that the first timestamp is within the predetermined period of the second timestamp, the first user identification data corresponds with the second user identification data, and the third name fails to at least partially match the first name.

7. The system of claim 1, wherein the instructions are further configured to cause the system to:
   store the referring link and the current link with the third name in a database responsive to determining that the first timestamp is within the predetermined period of the second timestamp, the first user identification data corresponds with the second user identification data, and the third name at least partially matches the first name.

8. A system comprising:
   one or more processors; and memory in communication with the one or more processors and storing instructions that, when executed by the one or more processors, are configured to cause the system to:
  receive a first timestamp associated with first interaction data at a user interface associated with an entity, a referring link, a current link, and first user identification data;
  receive transaction data comprising a second timestamp, second user identification data, and a first name associated with a transaction with the entity;
  determine whether the first timestamp occurs within a predetermined time threshold of the second timestamp;
  determine whether the first user identification data corresponds with the second user identification data; and
  responsive to determining that the first timestamp occurs within the predetermined time threshold of the second timestamp and the first user identification data corresponds with the second user identification data:
    extract a second name from the current link and a third name from the referring link; and
    identify, based on comparisons of the second name and the third name to the first name, one of the first name, the second name or the third name to transmit to a user device for display in a graphical user interface (GUI).

9. The system of claim 8, wherein the instructions are further configured to cause the system to:
  responsive to determining that (i) the first timestamp does not occur within the predetermined time threshold of the second timestamp or (ii) the first user identification data does not correspond with the second user identification data, identify the transaction as a card-on-file transaction and update the GUI to display an indicator representative of a card-on-file transaction.

10. The system of claim 8, wherein the instructions are further configured to cause the system to:
  generate or update an account statement with the transaction, referring link, the current link, and the first name in response to determining that the first timestamp occurs within the predetermined time threshold of the second timestamp and the first user identification data corresponds with the second user identification data.

11. The system of claim 8, wherein receiving the first timestamp associated with first interaction data at the user interface associated with the entity, the referring link, the current link, and the first user identification data occurs responsive to the user device accessing the current link.

12. The system of claim 8, wherein the first user identification data comprises single sign on identification data (SSOID).

13. The system of claim 12, wherein the second user identification data comprises account number, name, address associated with a first user and the transaction, or combinations thereof.

14. The system of claim 8, wherein the instructions are further configured to cause the system to:
  store the referring link and the current link with the first name in a database responsive to determining that the first timestamp occurs within the predetermined time threshold of the second timestamp and the first user identification data corresponds with the second user identification data.

15. The system of claim 8, wherein identifying one of the first name, the second name or the third name to transmit to the user device for display in the GUI comprises:
  determining whether the second name matches the first name beyond a predetermined matching threshold;
  based on the second name matching the first name beyond the predetermined matching threshold, transmitting the second name to the user device for display in the GUI;
  based on the second name failing to match the first name beyond the predetermined matching threshold:
    determining whether the third name matches the first name beyond the predetermined matching threshold;
    based on the third name matching the first name beyond the predetermined matching threshold, transmitting the third name to the user device for display in the GUI; and
    based on the third name failing to match the first name beyond the predetermined matching threshold, transmitting the first name to the user device for display in the GUI.

16. A system comprising:
one or more processors; and
memory in communication with the one or more processors and storing instructions that, when executed by the one or more processors, are configured to cause the system to:
  receive a first timestamp associated with first interaction data at a user interface associated with an entity, a referring link, a current link, and first user identification data;
  receive transaction data comprising a second timestamp, second user identification data, and a first name associated with a transaction with the entity;
  determine whether the first timestamp is within a predetermined period of the second timestamp;
  determine whether the first user identification data corresponds with the second user identification data; and
  responsive to determining that the first timestamp is within the predetermined period of the second timestamp and the first user identification data corresponds with the second user identification data:
    extract a second name from the current link and a third name from the referring link;
    determine whether the second name at least partially matches the first name; and
    when the second name at least partially matches the first name, generate or update an account statement associated with the transaction to include the referring link and the second name.

17. The system of claim 16, wherein the instructions are further configured to cause the system to:
  when the second name fails to at least partially match the first name:
    determine whether the third name at least partially matches the first name;
    when the third name at least partially matches the first name, generate or update the account statement associated with the transaction to include the third name; and
    when the third name fails to at least partially match the first name, generate or update the account statement associated with the transaction to include the first name.

18. The system of claim 16, wherein receiving the first timestamp associated with first interaction data at the user interface associated with the entity, the referring link, the current link, and the first user identification data occurs when a user device accesses the current link.

19. The system of claim 16, wherein:
the first user identification data comprises single sign on identification data (SSOID); and
the second user identification data comprises account number, name, address associated with a first user and the transaction, or combinations thereof.

20. The system of claim 16, wherein the instructions are further configured to cause the system to:
responsive to determining that the first timestamp is not within the predetermined period of the second timestamp or the first user identification data does not correspond with the second user identification data, associate the transaction as a card-on-file transaction and update a graphical user interface (GUI) to display a card-on-file indication; and
store the referring link and the current link with the third name in a database responsive to determining that the first timestamp is within the predetermined period of the second timestamp, the first user identification data corresponds with the second user identification data, and the third name at least partially matches the first name.

* * * * *